(12) United States Patent
Fukuda et al.

(10) Patent No.: US 7,663,332 B2
(45) Date of Patent: Feb. 16, 2010

(54) WALKING ROBOT BY USING PASSIVE CHANGES IN JOINT ANGLES AND CONTROL METHOD THEREOF

(75) Inventors: Toshio Fukuda, Nagoya (JP); Yasuhisa Hasegawa, Tsukuba (JP); Masahiro Doi, Nagoya (JP); Keisuke Suga, Toyota (JP); Yoshimi Kajitani, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 103 days.

(21) Appl. No.: 11/662,780

(22) PCT Filed: Sep. 13, 2005

(86) PCT No.: PCT/JP2005/017220
§ 371 (c)(1),
(2), (4) Date: Apr. 14, 2008

(87) PCT Pub. No.: WO2006/030934
PCT Pub. Date: Mar. 23, 2006

(65) Prior Publication Data
US 2008/0258669 A1    Oct. 23, 2008

(30) Foreign Application Priority Data
Sep. 14, 2004 (JP) ............................. 2004-267019

(51) Int. Cl.
*B25J 9/10* (2006.01)
(52) U.S. Cl. .............................. 318/568.12; 318/568.2; 901/1; 901/2; 901/15
(58) Field of Classification Search ................ 318/567, 318/568.1, 568.11, 568.12, 568.2; 901/1, 901/2, 9, 15, 16, 19, 23
See application file for complete search history.

(56) References Cited

U.S. PATENT DOCUMENTS 5,151,859 A * 9/1992 Yoshino et al. ............... 701/23

(Continued)

FOREIGN PATENT DOCUMENTS

EP    1 378 325    1/2004

(Continued)

OTHER PUBLICATIONS

M Doi, et al., "Passive Trajectory Control of the Lateral Motion in Bipedal Walking," *Proceedings of the 2004 IEEE*, New Orleans, LA—Apr. 2004, pp. 3049-3054 Written Opinion of the ISA.

*Primary Examiner*—Bentsu Ro
(74) *Attorney, Agent, or Firm*—Finnegan, Henderson, Farabow, Garrett & Dunner, LLP

(57) ABSTRACT

In a robot with two or more leg links having ankle joint respectively and pivotably linked to a torso, the robot walks naturally by making the ankle joint of a grounded leg link rotate freely by using passive movement. A controller executes controlling operation of calculating target joint angles of remaining joints other than the ankle joint of the grounded leg link based upon the measured joint angles of the ankle joint of the grounded leg link in the lateral and forward direction. The target joint angles of the remaining joints are calculated so as to satisfy the following condition that a tilting angle of the torso matches a target tilting angle determined based upon the measured joint angle of the ankle joint of the grounded leg link in the forward direction, a cycle period of the idle leg link from lifting to grounding, and a target stride of the idle leg link.

2 Claims, 9 Drawing Sheets

U.S. PATENT DOCUMENTS

| | | | |
|---|---|---|---|
| 5,206,569 A * | 4/1993 | Ozawa | 318/568.12 |
| 5,337,235 A | 8/1994 | Takahashi | |
| 5,349,277 A * | 9/1994 | Takahashi et al. | 318/568.12 |
| 5,432,417 A * | 7/1995 | Takenaka et al. | 318/568.12 |
| 7,057,367 B2 * | 6/2006 | Furuta et al. | 318/568.12 |
| 7,119,510 B2 * | 10/2006 | Kawai | 318/568.12 |
| 7,378,812 B2 * | 5/2008 | Yamamoto et al. | 318/568.12 |

FOREIGN PATENT DOCUMENTS

| | | |
|---|---|---|
| EP | 1 454 719 | 9/2004 |
| JP | 2004-276167 | 10/2004 |

\* cited by examiner

Global Coordinate System

US 7,663,332 B2

WALKING ROBOT BY USING PASSIVE CHANGES IN JOINT ANGLES AND CONTROL METHOD THEREOF

CROSS-REFERENCE TO RELATED APPLICATION

The present application claims priority based on Japanese Patent Application No. 2004-267019, filed on Sep. 14, 2004, the entire contents of which are incorporated by reference into this application.

TECHNICAL FIELD

The present invention relates to a robot in which two or more leg links are pivotably connected to a torso by means of hip joints, and which walks by pivoting said leg links.

BACKGROUND ART

Robots are being developed that walk by changing the relative postures among the left leg link, the hip, and the right leg link. When the relative postures among the left leg link, the hip, and the right leg link are to be changed, the relative postures among the left leg link, the hip, and the right leg link must be changed so that the robot can walk as a result. For this purpose, gait data is used that indicates the positions and postures of the left foot tip, the hip, and the right foot tip respectively.

As shown in FIG. 10, the gait data indicates the positions and postures of the left foot tip, the hip, and the right foot tip respectively in a global coordinate system that defines the coordinates of the space in which the robot is to move. In order to indicate the positions of the left foot tip, the right foot tip, and the hip, a reference point L0 is established for the left foot tip, a reference point R0 is established for the right foot tip, and a reference point W0 is established for the hip. In order to indicate the postures of the left foot tip, the right foot tip, and the hip, a reference vector L is established that is perpendicular to the left foot tip, a reference vector R is established that is perpendicular to the right foot tip, and a reference vector W is established that extends along the hip column. In the global coordinate system, the gait data indicates the x, y, z coordinates of the reference point L0 of the left foot tip, the x, y, z coordinates of the reference point R0 of the right foot tip, and the x, y, z coordinates of the reference point W0 of the hip. In addition, the gait data indicates the pitch angle L$\alpha$, the roll angle L$\beta$, and the yaw angle L$\gamma$ of the reference vector L, the pitch angle R$\alpha$, the roll angle R$\beta$, and the yaw angle R$\gamma$ of the reference vector R, and the pitch angle W$\alpha$, the roll angle W$\beta$, and the yaw angle W$\gamma$ of the reference vector W. The gait data chronologically records data that indicates the positions and the postures of the left foot tip, the right foot tip, and the hip. In FIG. 10, the pitch angle V$\alpha$, the roll angle V$\beta$, and the yaw angle V$\gamma$ of the vector V is illustrated.

When gait data that indicates the positions and postures of the left foot tip, the right foot tip, and the hip, are given, the robot will calculate the joint angles of joints needed to take the given positions and given postures, and will adjust joint angles of the joints to be equal to these calculated joint angles. Because the gait data is chronologically changed, the joint angles will also be chronologically changed. The robot will walk by chronologically changing the relative postures between the left leg link, the hip, and the right leg link in accordance with the gait data. The robot will continue walking without tipping over because the positions ($W_x$, $W_y$, $W_z$) and postures (W$\alpha$, W$\beta$, W$\gamma$) of the hip are calculated to satisfy a relationship that ZMP (zero moment point) of the robot will remain within the foot plane of the leg that is in contact with the ground. The aforementioned method can be said to be a method of actively changing joint angles of all of the joints of the robot in order to walk, and is disclosed, among other places, in Japanese Laid-Open Patent Application Publication H05-253867.

The present inventors have been performing an intensive study of walking technology that is different from the technology described above, and in which some of the joints angles of the robot are passively changed and the robot walks with natural movement. In an application that precedes the present application (Japanese Laid-Open Patent Application Publication 2004-276167), a robot and a control method thereof are disclosed in which the robot will perform natural and stable stepping movements within a lateral plane and draw the idle leg forward in association with the circle of stepping within the lateral plane. The robot will walk with natural movement. With the aforementioned technology, the ankle joint of the grounded leg of the robot pivots freely, the joint angle of the ankle joint is measured, and joint angles of the remaining joints of the robot are adjusted based upon the measured joint angle of the ankle joint of the grounded leg. The joint angles of the remaining joints are adjusted so that the center of gravity of the robot moves toward a position at which the idle leg link will be grounded. With the aforementioned technology, a robot walks with a natural and passive movement because the ankle joint of the grounded leg of the robot can rotate freely and naturally.

By employing the aforementioned technology, the robot steps with a natural movement while walking. Because inertia and gravity that act upon the robot are effectively used to achieve the aforementioned stepping movements, a robot is capable of walking with less energy than when all joints thereof are actively moved.

DISCLOSURE OF INVENTION

However, the aforementioned walking control technology has further room for improvement. In the aforementioned walking control technology, because the robot walks with passive movements, its walking state may change, and the stride thereof may be disturbed, when an external disturbance is applied thereto. With the aforementioned walking control technology, the robot continues to walk with a natural movement even when the stride of the robot has been disturbed. However, it is difficult to control the walking so as to be in a predetermined stride.

There will be times when it is necessary to make the robot walk with a target stride (predetermined stride) even when an external disturbance is applied as noted above. There is a need for technology that makes it possible for the ankle joint of the grounded leg (support leg) to be passively pivoted and cause a robot to walk with a natural movement, while at the same time causing the robot to walk with the target stride.

The aforementioned problem is solved in the present invention. In a robot whose ankle joint of the grounded leg can rotate freely and can be passively pivoted, and which walks with a natural movement, the present invention provides technology that allows the robot to walk with the target stride.

One robot that is embodied in the present invention is equipped with two or more leg links pivotably linked to a torso by means of hip joints. Each leg link has an ankle joint, and the robot uses passive changes of joint angle of the ankle joint of the grounded leg to walk.

This robot includes a controller that performs the followings controlling operations:
1) allowing free rotation of the ankle joint of a grounded leg link in lateral and forward directions;
2) measuring joint angles of the ankle joint of the grounded leg link in the lateral and forward directions;
3) calculating target joint angles of remaining joints of the robot other than the ankle joint of the grounded leg link based upon the measured joint angles of the ankle joint of the grounded leg link in the lateral and forward directions; and
4) adjusting joint angles of the remaining joints to be equal to the calculated target joint angles respectively.

According to the controller as described, a period in which one of the leg links is the grounded leg link and the other of the leg links is an idle leg link and a period in which the one of the leg links is the idle leg link and the other of the leg links is the grounded leg link are cyclically repeated, and the robot walks. The details of how the controller works to make the robot to walk is disclosed in the above described Japanese Laid-Open Patent Application Publication 2004-276167.

In the robot according to the present invention, the target joint angles of the remaining joints are calculated based upon the measured joint angles of the ankle joint of the grounded leg link in the lateral and forward directions under the following conditions:
a) a center of gravity of the robot moves toward a predicted grounding position of the idle leg link between the grounding position of the grounded leg link and the predicted grounding position of the idle leg link in the lateral direction and moves toward the predicted grounding position of the idle leg link in the forward direction when the joint angles of the remaining joints are adjusted to be equal to the calculated target joint angles respectively;
b) when the idle leg link is newly grounded, the hip joints are positioned ahead of the tip of the previously grounded leg link, and the tip of the newly grounded leg link is positioned ahead of the hip joints; and
c) a tilting angle of the torso matches a target tilting angle determined based upon the measured joint angle of the ankle joint of the grounded leg link in the forward direction, a cycle period of the idle leg link from lifting to grounding, and a target stride of the idle leg link.

Because the ankle joint of the grounded leg link of the aforementioned robot is freely pivotable, the grounded leg link itself tends to naturally and passively tilt. At this point, the other joint angles are actively adjusted, and the robot is controlled so that the other leg link (idle leg link) is grounded before the robot tips over, thereby preventing the robot from falling. The newly grounded idle leg link becomes the grounded leg link, and the previous grounded leg link becomes the idle leg link. By repeating this cycle, the robot continues to walk while alternating the grounded leg link and the idle leg link.

When the robot continues to walk forward, a forward inertia is applied to the center of gravity of the robot. Because of this, when the joint angle of the ankle joint of the newly grounded leg link in the forward direction is allowed to freely rotate when the leg link is newly grounded, the center of gravity of the robot exhibits the behavior of an inverse pendulum in which the ankle joint of the grounded link leg is a fulcrum, and moves forward, e.g., toward the predicted grounding position of the idle leg link. The joint angles of the other joints are actively adjusted so that the hip joints are positioned ahead of the tip of the grounded leg link and the tip of the idle leg link is positioned ahead of the hip joints when the idle leg is to be grounded, and thus the idle leg link gets grounded ahead of the grounding position of the grounded leg link. Because a forward inertia is applied to the center of gravity of the robot at the time when the grounded leg link is alternated, the center of gravity of the robot exhibits the behavior of an inverted pendulum in which the ankle joint of the alternated grounded leg link is a fulcrum, and moves further forward. By repeating the aforementioned process, the robot continues to stably walk forward.

A natural walking movement can be obtained from the aforementioned process because the movement of the grounded leg link is naturally and passively produced. The energy needed for walking can also be reduced because the walking action is realized by using movements of the robot that are harmonizing with the dynamics of the robot. The robot stops when a person outstretches his/her hand toward the robot and stops its passive movement. This feature is also useful for the coexistence between people and the robot, providing a high degree of safety.

The movement of the robot from lifting to grounding of the idle leg link changes depending on the tilt of the torso. When the torso is tilted forward, the center of gravity of the robot moves forward and downward, and the distance from the ankle joint of the grounded leg link that acts as the fulcrum for movements of the center of gravity of the robot becomes shorter for most period of time from lifting to grounding of the idle leg link. As a result, the center of gravity of the robot moves forward quickly, and the idle leg link also rotates upwardly quickly. Because the tilt of the torso has little impact on the cycle period of stepping within the lateral plain, the time from lifting to grounding of the idle leg link is not impacted by the tilt of the torso. Thus, by tilting the torso, angle between the grounded leg link and the idle leg link when the idle leg link is newly grounded becomes larger and the idle leg link reaches farther forward and is grounded, as a result, widening the stride of the robot.

By using the aforementioned relationships, it is possible to identify tilting angle of the torso that will achieves the target stride at a time when the grounded leg link is to be alternated. By adjusting the actively controlled joint angles so the target tilting angle of the torso is obtained, it becomes possible to make the robot walk with the target stride.

The movement of the robot in the forward walking direction from lifting to grounding of the idle leg link will be determined by the joint angle and joint angle speed of the freely pivotable ankle joint of the grounded leg link in the forward direction, and the cycle period of the stepping movements within the lateral plane. The joint angle and joint angle speed of the ankle joint of the grounded leg link in the forward direction can be measured. The cycle period of the stepping movements within the lateral plane may also be measured during walking, or may be calculated from the chronological changes in the joint angle of the ankle joint within the lateral direction of the robot.

The relationships between the joint angle and joint angle speed of the freely pivotable ankle joint of the grounded leg link in the forward direction, the cycle period of the stepping movement within the lateral direction of the robot, the tilting angle of the torso, and the stride, may be acquired in advance by means of experimentation, or may be calculated based upon the dynamic characteristics of the robot.

With the aforementioned stride control, the target tilting angle of the torso can be identified based upon the chronological changes of joint angle of the freely pivotable ankle joint, the cycle period of the stepping movement, and the target stride, each time the grounded leg links is exchanged. Even when an external disturbance is applied to the robot while the robot is continuing to walk and walking state of the robot is changed due to the external disturbance, tilting angle of the torso can be adjusted timely based upon the walking state at that time, and walking at the desired stride can be continued.

The present invention may also be embodied in a method of controlling a robot. The robot includes at least two leg links, and each leg link is pivotably connected to a torso by a hip joint. Each leg link has an ankle joint. The method includes the following steps:
1) a step of allowing free rotation of the ankle joint of a grounded leg link in lateral and forward directions;
2) a step of measuring joint angles of the ankle joint of the grounded leg link in the lateral and forward directions;
3) a step of calculating target joint angles of remaining joints of the robot other than the ankle joint of the grounded leg link based upon the measured joint angles of the ankle joint of the grounded leg link in the lateral and forward directions; and
4) a step of adjusting joint angles of the remaining joints to be equal to the calculated target joint angles respectively.

When the robot is controlled in accordance with these steps, a period in which one of the leg links is the grounded leg link and the other of the leg links is the idle leg link and a period in which the one of the leg links is the idle leg link and the other of the leg links is the grounded leg link are cyclically repeated, and the robot walks.

In the present method, the target joint angles of the remaining joints are calculated based upon the measured joint angles of the ankle joint of the grounded leg link in the lateral and forward directions under the following conditions:
a) a center of gravity of the robot moves toward a predicted grounding position of the idle leg link between the grounding position of the grounded leg link and the predicted grounding position of the idle leg link in the lateral direction and moves toward the predicted grounding position of the idle leg link in the forward direction when the joint angles of the remaining joints are adjusted to be equal to the calculated target joint angles respectively;
b) when the idle leg link is newly grounded, the hip joints are positioned ahead of the tip of the previously grounded leg link, and the tip of the newly grounded leg link is positioned ahead of the hip joints; and
c) a tilting angle of the torso matches a target tilting angle determined based upon the measured joint angle of the ankle joint of the grounded leg link in the forward direction, a cycle period of the idle leg link from lifting to grounding, and a target stride of the idle leg link.

According to the method of controlling the robot of the present invention, the robot can walk with the target stride utilizing a phenomenon that naturally changes. This will match well with human walking patterns, and a natural walking movement will be obtained. In addition, the controlling method naturally matches dynamics of the robot, allowing it to walk with low energy consumption. Furthermore, because a phenomenon that naturally changes is utilized to make the robot walk, the robot stops walking when a person makes natural changes stop. Because the robot stops walking when a person outstretches his/her hand, it will be easy for people to coexist with the robot, and a high degree of safety can be maintained.

BRIEF DESCRIPTION OF DRAWINGS

The present invention may be more clearly understood by referring to the drawings below. The constituent elements of the drawings are not necessarily drawn in a fixed scale, but rather emphasis is employed in order to clearly demonstrate the fundamental aspects of the present invention. In the drawings, like reference numerals denote like portions in different drawings.

FIG. 2(1) shows the control items while the right leg is a grounded state.
FIG. 2(2) shows the control items while the left leg is the grounded state.

BEST MODE FOR CARRYING OUT THE INVENTION

Examples in which the present invention is embodied will be described below with reference to the drawings.

Figure 1:
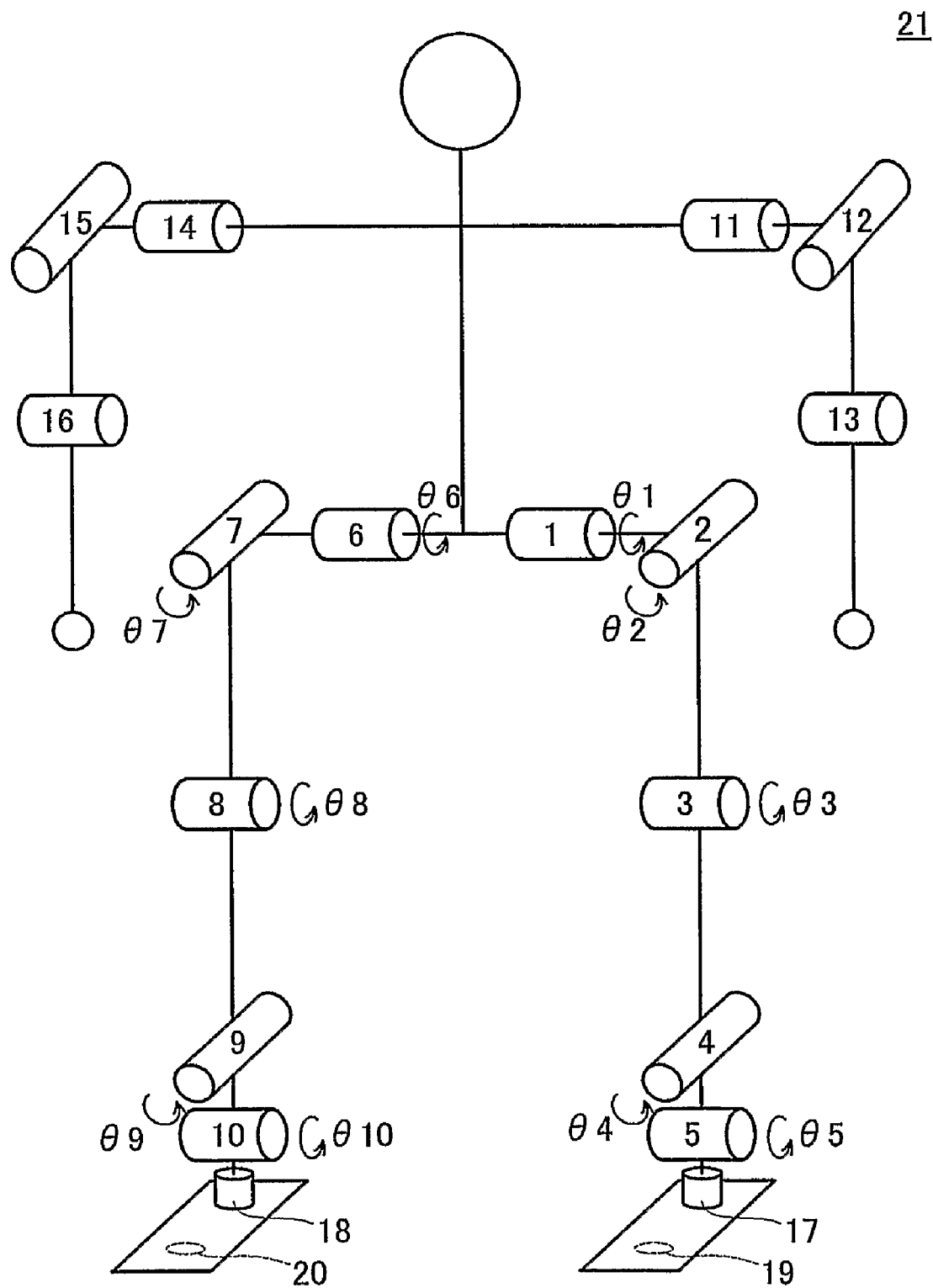
FIG. 1 shows a mechanical structure of a robot.

FIG. 1 shows a mechanical structure of robot 21. The robot 21 comprises a pair of hip joints with two rotation axes, a pair of knee joints with one rotation axis, a pair of ankle joints with two rotation axes, a pair of shoulder joints with two rotation axes, and a pair of elbow joints with one rotation axis. The robot 21 comprises motors having encoders on each rotational axis, and can adjust joint angles and measure joint angles. $\theta 1$ to $\theta 10$ indicate joint angles. Reference numerals 17, 18 indicate force sensors, and 19, 20 indicate photosensors. The photosensors 19, 20 detect whether the foot plane is grounded or lifted.

Figure 2:
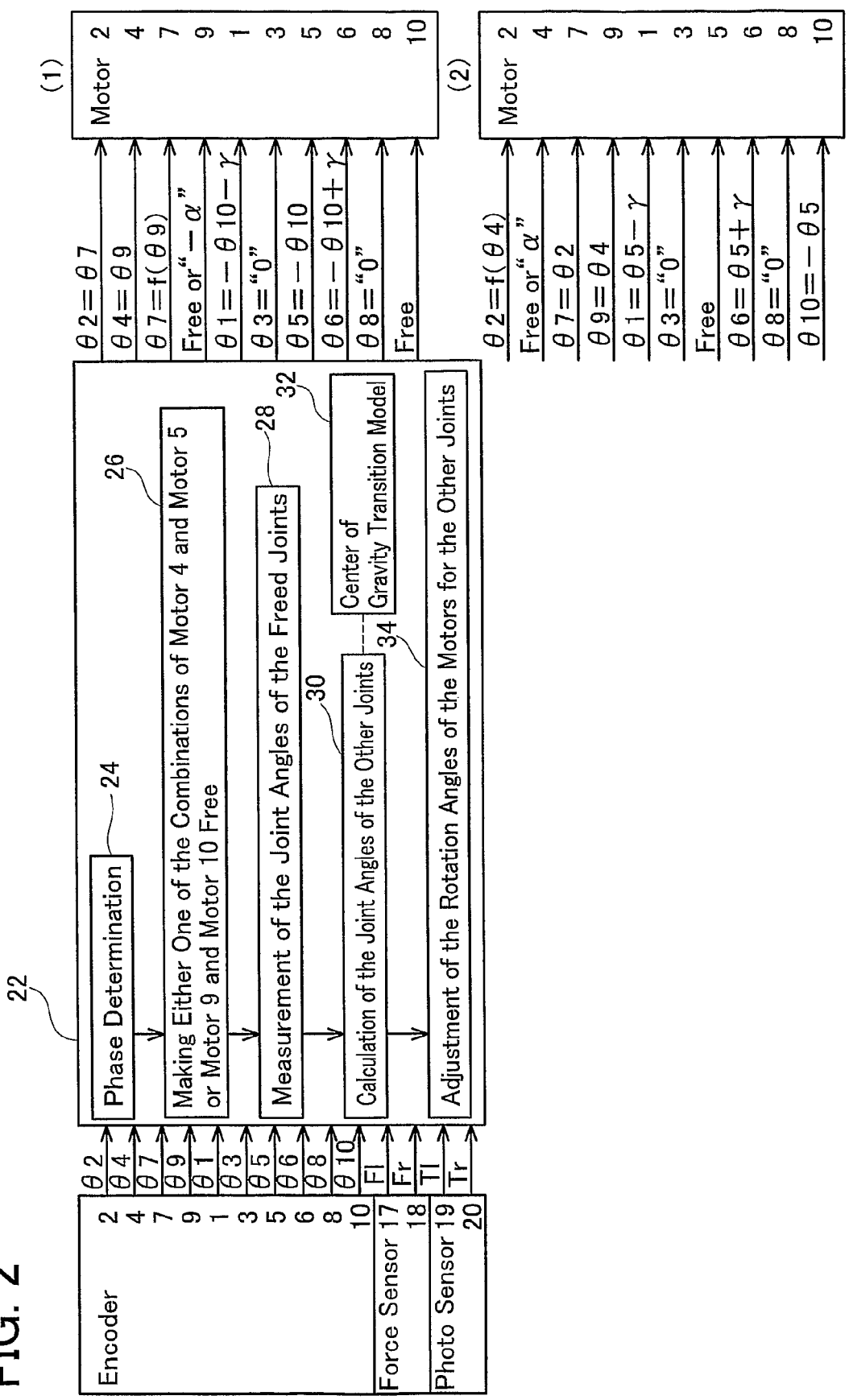
FIG. 2 shows components of a controller for the robot.

FIG. 2 shows the components of controller 22 for robot 21. The outputs of encoders 1 to 10, the outputs of force sensors 17, 18, and the output of photosensors 19, 20 are input into controller 22, which instructs rotation angles of motors 1 to 10 respectively.

Figure 3:
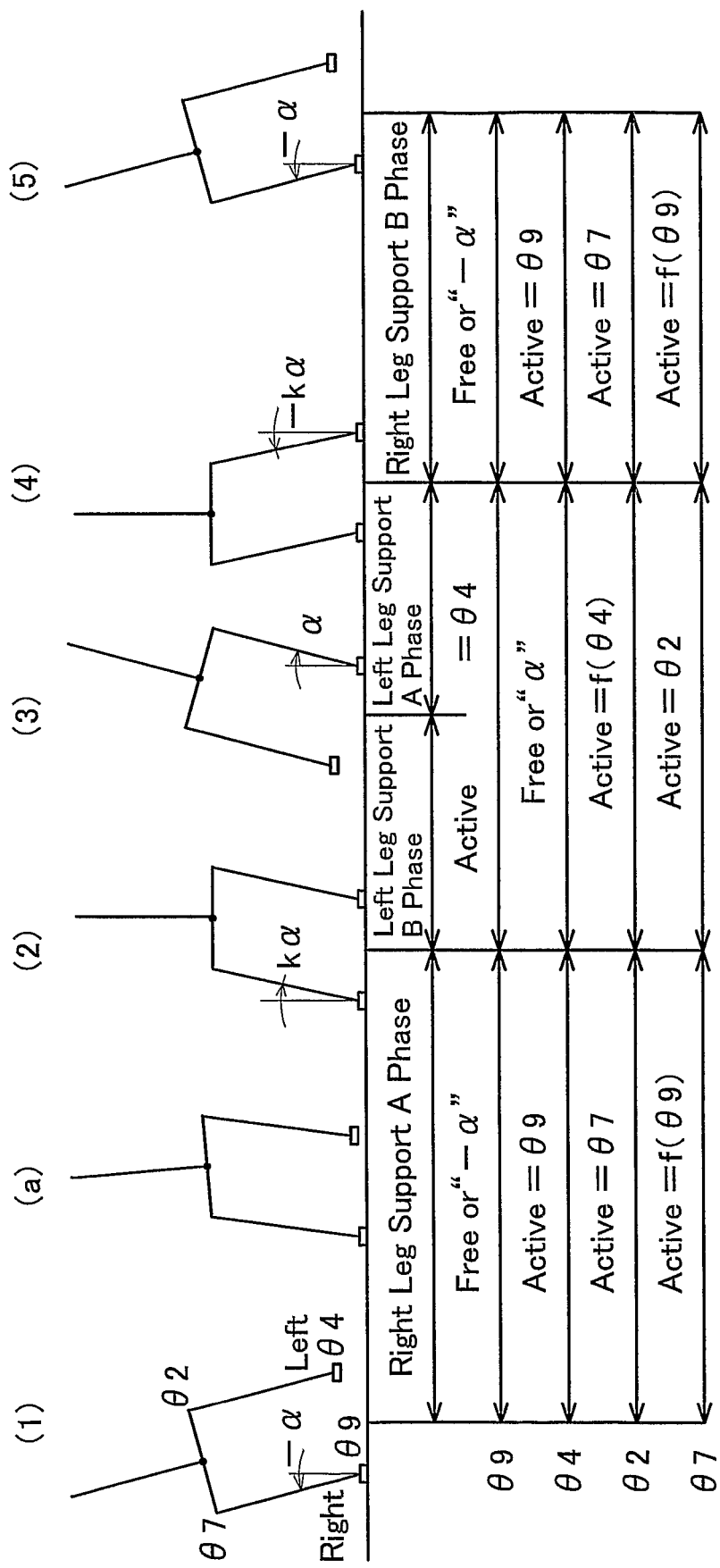
FIG. 3 shows the right/left stepping movements of the robot, and contrasts them with the control items.

FIG. 3 shows a walking robot viewed from the front. (1) shows the state in which the right leg is planted. (a) shows the state in which robot 21 is tilted left from the state shown in (1), immediately before the left leg is placed on the ground. (2) shows the state in which the left leg is placed on the ground. (3) shows the state in which robot 21 is tilted further to the left, and the left leg is planted. (4) shows a state in which robot 21 is tilted right from the state shown in (3), and the right leg is placed on the ground. (5) shows the state in which robot 21 is tilted further to the right, and the right leg is planted. (1) and (5) are the same state, and (3) is an opposite left/right symmetrical state. (2) and (4) are the opposite left/right symmetrical state. The robot 21 repeats the states (1), (2), (3), (4), and (1) of FIG. 3 by means of the controller 22, to perform the stepping movement within the lateral plane (stepping right and left).

Figure 4:
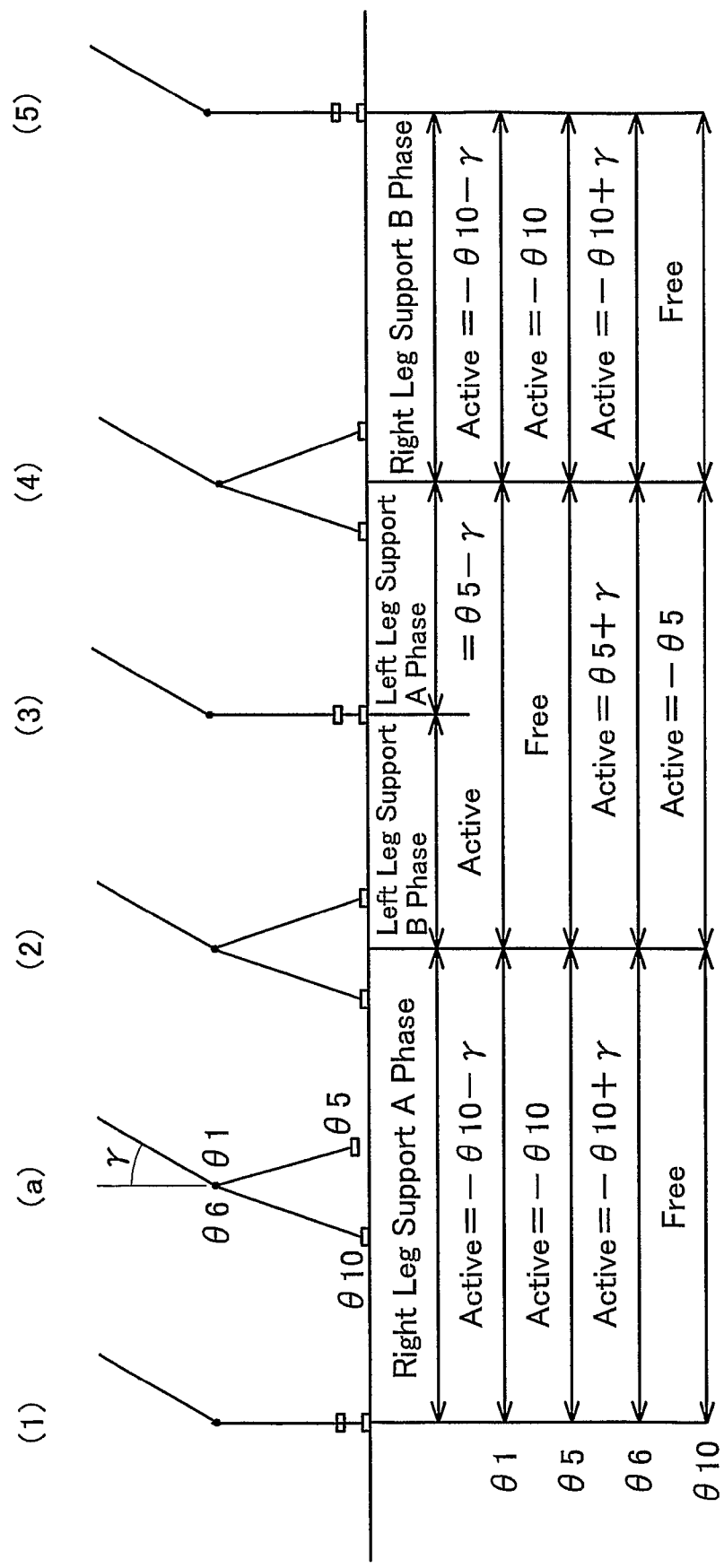
FIG. 4 shows the forward walking movement of the robot, and contrasts it with the control items.

FIG. 4 shows a walking robot viewed from the side. States (1), (a), (2), (3), (4) and (5) of FIG. 4 respectively correspond to states (1), (a), (2), (3), (4) and (5) of FIG. 3. (1) shows the state in which the right leg is in contact with the ground and the left leg is lifted. (a) shows the state in which the center of gravity is moving forward from the state shown in (1), immediately before the left leg is placed on the ground. (2) shows the state in which the left leg has been placed forward on the ground. (3) shows the state in which the right leg is lifted from the state shown in (2) and the center of gravity has moved farther forward. (4) shows the state in which the center of gravity is moving forward from the state shown in (3), and the right leg has been placed forward on the ground. (5) shows the state in which the left leg is lifted from the state shown in (4) and the center of gravity has moved farther forward. (1) and (5) are the same states, and (3) is an opposite left/right symmetrical state. (2) and (4) are the opposite left/right symmetrical state.

The robot 21 performs the forward movement within the sagittal plane shown in FIG. 4, in synchronization with the right and left stepping movement within the lateral plane shown in FIG. 3, by means of the controller 22 and walks forward.

As shown in FIG. 2, the controller 22 has a phase determination means 24, and the control items can be switched in accordance with the phase that has been determined. As shown in FIG. 3 and FIG. 4, the phases are divided into four states: a right leg support A phase from state (1) to state (2), a left leg support B phase from state (2) to state (3), a left leg support A phase from state (3) to state (4), and a right leg support B phase from state (4) to state (5).

Figure 5:
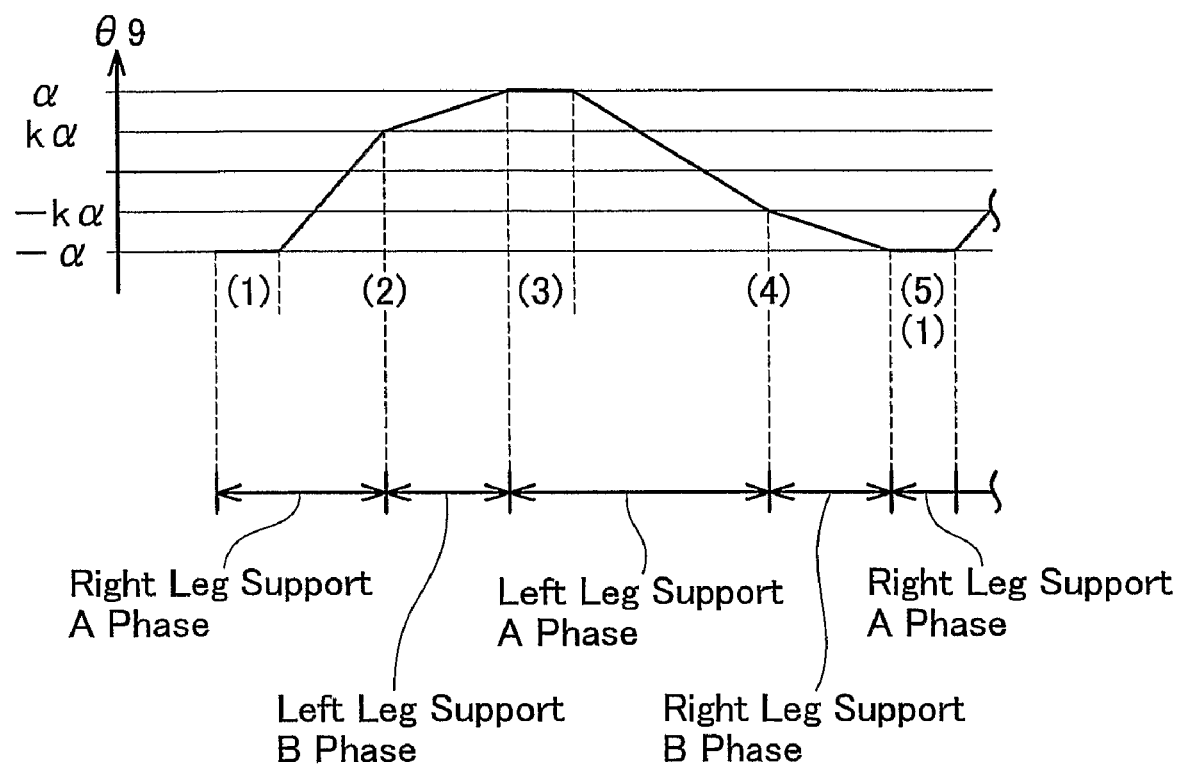
FIG. 5 shows chronological change of a joint angle $\theta 9$.

FIG. 5 shows the chronological change in the joint angle $\theta 9$ of the right ankle joint in the lateral direction. With robot 21 in state (1), the joint angle $\theta 9$ is $-\alpha$ (the minimum joint angle of this joint). When the joint angle $\theta 9$ rotates up to $k\alpha$ (k is a constant of 1 or lower), robot 21 is in state (2) and the left leg comes into contact with the ground. With robot 21 in state (3), the joint angle $\theta 9$ is $+\alpha$ (the maximum joint angle of this joint). When the joint angle $\theta 9$ rotates down to $-k\alpha$, robot 21 is in state (4) and the right leg comes into contact with the ground. With robot 21 in state (5), the joint angle $\theta 9$ is $-\alpha$ and in state (1).

Figure 6:
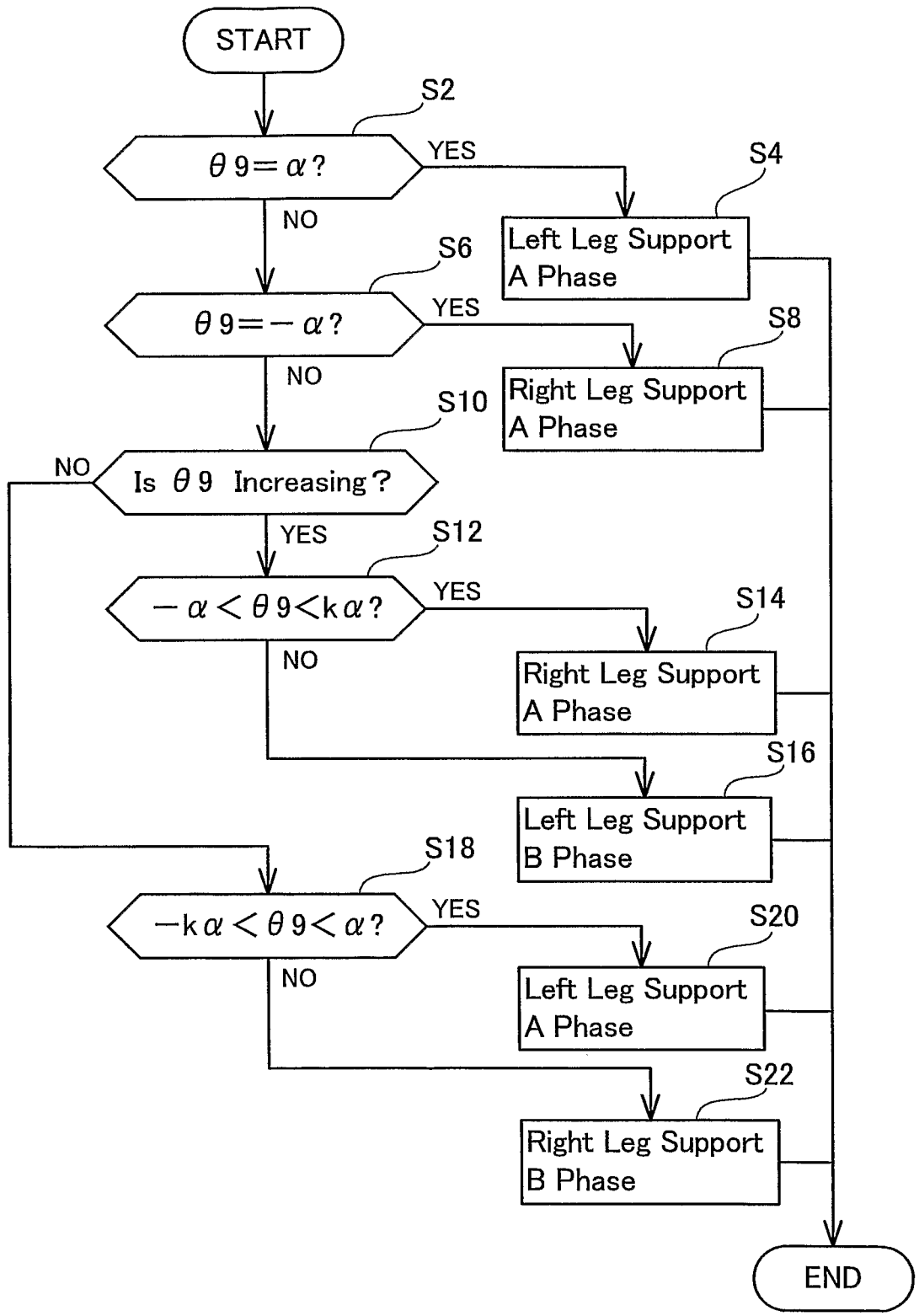
FIG. 6 illustrates a phase determination process protocol.

FIG. 6 shows an example of the determination process procedure according to the phase determination means 24. The phase determination means 24 identifies the phases by means of the joint angle $\theta 9$ of the right ankle joint in the lateral direction. If $\theta 9 = \alpha$ in Step S2, then the phase determination means 24 identifies this as the left leg support A phase (Step S4). If $\theta 9 = -\alpha$ in Step S6, then the phase determination means 24 identifies this as the right leg support A phase (Step S8). If $\theta 9$ is increasing in Step S10, and $\theta 9$ is greater than $-\alpha$ and smaller than $k\alpha$ in Step S12, then the phase determination means 24 identifies this as the right leg support A phase (Step S14). If $\theta 9$ is increasing in Step S10, and $\theta 9$ is greater than or equal to $k\alpha$ in Step S12, then the phase determination means 24 identifies this as the left leg support B phase (Step S16). If $\theta 9$ is decreasing in Step S10, and $\theta 9$ is less than $\alpha$ and greater than $-k\alpha$ in Step S18, then the phase determination means 24 identifies this as the left leg support A phase (Step S20). If $\theta 9$ is decreasing in Step S10, and $\theta 9$ is less than or equal to $-k\alpha$ in Step S18, then the phase determination means 24 identifies this as the right leg support B phase (Step S22). This phase determination process procedure is only an example, and various other procedures can be employed. Data from the force sensors 17, 18 and the photosensors 19, 20 can also be applied to determine the phase.

The controller 22 shown in FIG. 2 switches the control items in accordance with the determination results of the phase determination means 24. FIG. 2(1) shows the control items in the right leg support state. In the right leg support state, the controller 22 controls them as follows.

1) Allows the motors of the right ankle joint of the grounded right leg in the lateral direction ($\theta 9$ in this situation) and the forward direction ($\theta 10$ in this situation) to freely rotate on their own. Makes the joints $\theta 9$ and $\theta 10$ passive joints (free joints), and allows them to passively rotate.
2) Measures the angles $\theta 9$ and $\theta 10$ of the passively rotating joints.
3) Based upon the joint angle $\theta 9$ that was measured, calculates the target joint angle of the hip joint of the grounded right leg in the lateral direction ($\theta 7$ in this situation). The details of this calculation will be provided below.
4) Makes the target joint angle of the hip joint of the idle leg (left leg in this situation) in the lateral direction ($\theta 2$ in this situation) equal to $\theta 7$. As a result, the grounded right leg and the idle left leg are maintained in parallel when viewed from the forward direction.
5) Makes the target joint angle of the ankle joint of the idle leg (left leg in this situation) in the lateral direction ($\theta 4$ in this situation) equal to $\theta 9$. As a result, the foot plane of the idle left leg is maintained in parallel with the foot plane of the grounded right leg.
6) Maintains the knee joints ($\theta 3$ and $\theta 8$) at an angle in which the knees are extended straight (here, zero).
7) Based upon the joint angle $\theta 10$ that was measured, makes the target joint angle of the hip joint of the grounded right leg in the forward direction ($\theta 6$ in this situation) equal to $-\theta 10+\gamma$. By doing so, the torso of robot 21 is tilted forwardly by the angle $\gamma$ from the direction that is perpendicular to the ground. The angle $\gamma$ is a target tiling angle of the torso. Details on the calculation of $\gamma$ will be provided below.
8) Makes the target joint angle of the hip joint of the idle left leg in the forward direction ($\theta 1$ in this situation) equal to $-\theta 10-\gamma$. In this way, the idle left leg begins to step in the forward direction.
9) Makes the target joint angle of the left ankle joint of the idle left leg in the forward direction ($\theta 5$ in this situation) equal to $-\theta 10$. In this way, the foot plane of the idle left leg is maintained in parallel with the foot plane of the grounded right leg.

FIG. 2(2) shows the control details in the left leg support state. In the left leg support state, the controller 22 controls them as follows.

1) Allows the motors of the left ankle joint of the grounded left leg in the lateral direction ($\theta 4$ in this situation) and the forward direction ($\theta 5$ in this situation) to freely rotate on their own. Makes the joints $\theta 4$ and $\theta 5$ passive joints (free joints), and allows them to passively rotate.
2) Measures the angles $\theta 4$ and $\theta 5$ of the passively rotating joints.
3) Based upon the joint angle $\theta 4$ that was measured, calculates the target joint angle of the hip joint of the grounded left leg in the lateral direction ($\theta 2$ in this situation). The details of this calculation will be provided below.
4) Makes the target joint angle of the hip joint of the idle leg (left leg in this situation) in the lateral direction ($\theta 7$ in this situation) equal to $\theta 2$. As a result, the grounded left leg and the idle right leg are maintained in parallel when viewed from the forward direction.
5) Makes the target joint angle of the ankle joint of the idle leg (left leg in this situation) in the lateral direction ($\theta 9$ in this situation) equal to $\theta 4$. As a result, the foot plane of the idle right leg is maintained in parallel with the foot plane of the grounded left leg.
6) Maintains the knee joints ($\theta 3$ and $\theta 8$) at an angle in which the knees are extended straight (here, zero).
7) Based upon the joint angle $\theta 5$ that was measured, makes the target joint angle of the hip joint of the grounded left leg in the forward direction ($\theta 1$ in this situation) equal to $\theta 5-\gamma$. By doing so, the torso of robot 21 is tilted forwardly by the angle γ from the direction that is perpendicular to the ground. The angle γ is a target tiling angle of the torso. Details on the calculation of γ will be provided below.

8) Makes the target joint angle of the hip joint of the idle right leg in the forward direction (θ6 in this situation) equal to θ5+γ. In this way, the idle right leg begins to step in the forward direction.

9) Makes the target joint angle of the right ankle joint of the idle right leg in the forward direction (θ10 in this situation) equal to −θ5. In this way, the foot plane of the idle right leg is maintained in parallel with the foot plane of the grounded left leg.

As shown in FIG. 2, the controller 22 comprises the phase determination means 24, and a plurality of means 26, 28, 30 and 34. The means 26 makes either one of the combinations of motor 4 and motor 5 or motor 9 and motor 10 free based on the phase determined. The means 28 measures the rotation angles of the freed ankle joints (θ4 and θ5 or θ9 and θ10). The means 30 calculates the target joint angles of the other motors in accordance with the joint angles that were measured by the means 28. The means 34 adjusts the joint angles of the other motors to be equal to the calculated target joint angles respectively. When the joint angles of the other motors are to be calculated, a lateral center of gravity transition model and a forward center of gravity transition model (32, described below) are used.

Figure 7:
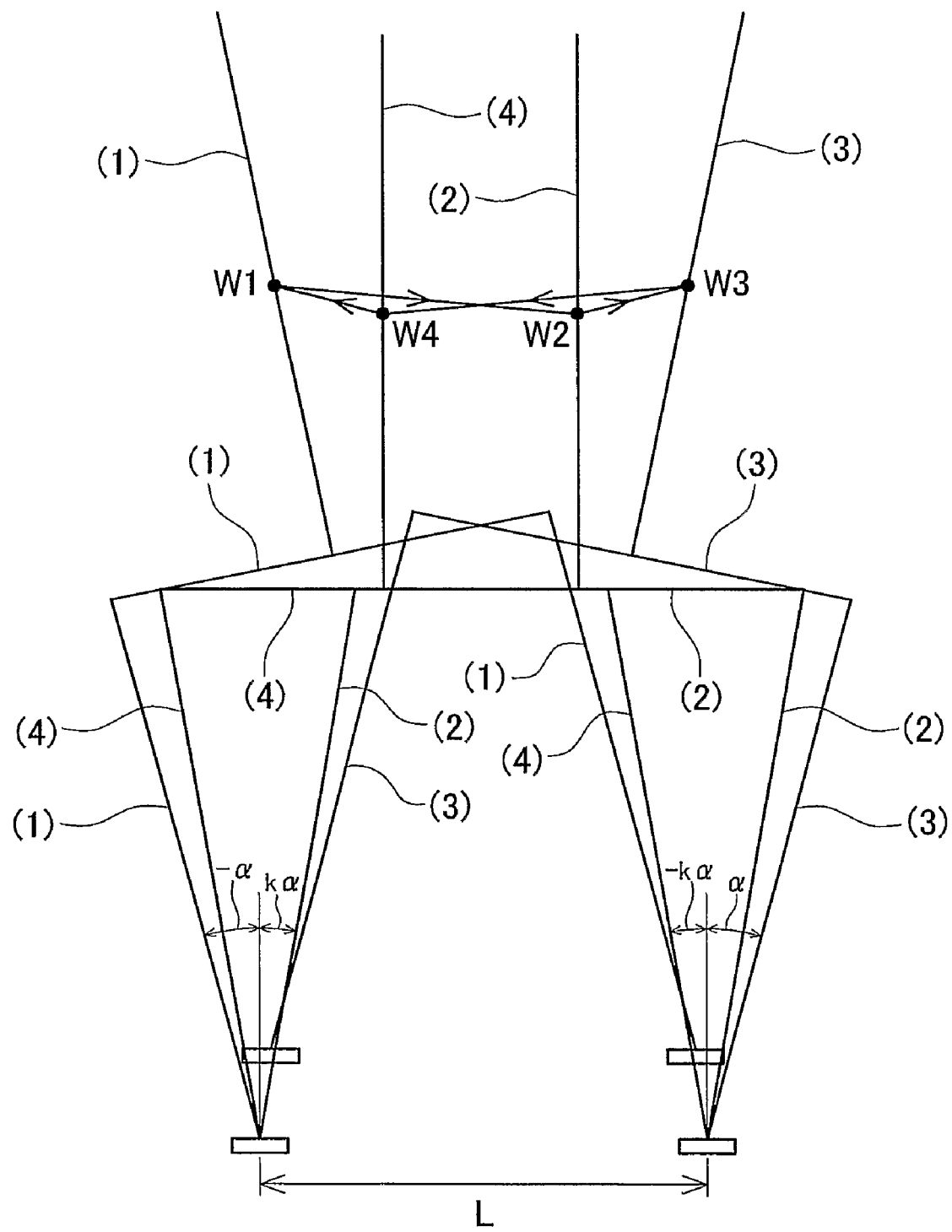
FIG. 7 shows movement paths of the center of gravity within the lateral plane.

The lateral center of gravity transition model is described below. As shown in FIG. 7, when the right foot is planted in state (1) and is maintained at θ9=−α, the center of gravity of robot 21 is at position W1. If θ9 is kα when robot 21 tilts left from state (1) and the left foot is placed on the ground, the center of gravity of robot 21 is at position W2.

After state (1), i.e., in the right leg support A phase, the center of gravity changes in response to the joint angle θ9 that is free. If the center of gravity is at W1 with θ9=−α, the center of gravity moves from W1 to W2 as robot 21 tilts left. When the center of gravity is moved to W2 at a condition that θ9=kα, robot 21 changes from state (1) to state (2).

The center of gravity within the lateral plane of robot 21 (the plane perpendicular to the forward walking direction) is determined by θ2, θ4, θ7 and θ9. In the right leg support state, θ9 is free (measurements can be made but not actively controlled), θ4 is equal to θ9, θ2 is equal to θ7, and θ7 is calculated based upon θ9. If θ7 is calculated from θ9 so as to satisfy the following relations:

1) the center of gravity of robot 21 is at W1 when θ9=−α and θ7 is adjusted to be equal to θ7 calculated based upon θ9 (−α in this situation);
2) the center of gravity of robot 21 is at W2 when θ9=kα and θ7 is adjusted to be equal to θ7 calculated based upon θ9 (kα in this situation);

then robot 21 changes from state (1) to state (2).

The center of gravity W1 when θ9=−α is to the left of the grounding position of the right leg, and robot 21 will not tilt any further to the right than this. The robot 21 will not tip over to the right. Because the center of gravity W1 is to the left of the grounding position of the right leg, if the joint θ9 is allowed to rotate freely, robot 21 will tilt to the left.

The target joint angle of the joint θ7 can be calculated with respect to the measured value of θ9 based upon geometric relationships, so that for example, the position of the center of gravity within the lateral plane of robot 21 will move in a straight line from W1 to W2. When θ7 is calculated by means of the above, and actual joint angle is adjusted to be equal to the calculated joint angle θ7, a relationship will be obtained in which the center of gravity of robot 21 is at W1 when θ9=−α, moves from W1 to W2 as robot 21 tilts to the left, and arrived at W2 when θ9=kα.

FIG. 7 also shows the transition of the center of gravity from state (2) to state (3). The center of gravity when the left foot is planted and θ4=α is maintained is indicated by W3. If θ2, θ7 and θ9 are controlled in accordance with the change in θ4 so that the center of gravity arrives at W3 in state (3), robot 21 changes from state (2) to state (3).

In the left leg support B phase, θ2 is calculated from θ4, and control is performed so that θ7=θ2 and θ9=θ4. If a relationship is obtained in which the center of gravity of robot 21 is at W2 when θ4=−kα, moves from W2 toward W3 as robot 21 tilts left, and arrives at W3 when θ4=α, robot 21 changes from state (2) to state (3). In this situation as well, methods similar to the aforementioned calculation of θ7 can be employed, and θ2 can be calculated based upon θ4.

The center of gravity W3 when θ4=α is to the right of the grounding position of the left leg, and robot 21 will not tilt any further to the left than this. The robot 21 will not tip over to the left. Because the center of gravity W3 is to the right of the grounding position of the left leg, if the joint θ4 is allowed to freely rotate, robot 21 will tilt to the right.

FIG. 7 also shows the transition of the center of gravity from state (3) to state (4). If the center of gravity is at W4 position when robot 21 tilts to the right, θ4 is −kα, and the right foot is grounded, robot 21 changes from state (3) to state (4).

Likewise, FIG. 7 also shows the transition of the center of gravity from state (4) to state (1). If the center of gravity is at W1 position when the right leg of robot 21 is planted at θ9=−α, robot 21 changes from state (4) to state (1).

The center of gravity within the lateral plane is between W1 and W3, but is within a length L between the grounding positions of the left and right leg links in the lateral direction. The center of gravity when the left leg link is the idle leg link moves toward the grounding position of the left leg link, and the center of gravity when the right leg link is the idle leg link moves toward the grounding position of the right leg link.

In the right leg support A phase from state (1) to state (2), this phenomenon naturally occurs because the center of gravity falls. Although the center of gravity rises in the left leg support B phase from state (2) to state (3), this phenomenon naturally occurs because of the presence of inertia when robot 21 tilts left from state (1) to state (2). Likewise, in the left leg support A phase from state (3) to state (4), this phenomenon naturally occurs because the center of gravity falls. Although the center of gravity rises in the right leg support B phase from state (4) to state (1), this phenomenon naturally occurs because of the presence of inertia when robot 21 tilts right from state (3) to state (4).

The repeated movement from state (1) to state (5) resembles a triangular prism repeating a pendulum movement on a floor having a reflection coefficient of 1, and can continue movement with little energy. If there is no friction in a pivotable or rotatable joint, the repeated movement from state (1) to state (5) can be repeated without any attenuation. In fact, friction does exist. By providing torque in the motors for the rotatable joints that merely compensates for friction, a state in which friction does not exist can be created. In the present invention, the term that a joint is allowed to rotate freely means allowing passive rotation of the joint without applying an electric current to the motor. If the friction applies and free rotation may be disturbed, a torque that compensates the friction may be applied by the motor to promote the free rotation. This state is also a state that a joint is allowed to rotate freely.

The forward center of gravity transition model will be described below. Repeated movement from state (1) to state (4) will achieve stepping movements of the right and left legs within the lateral plane. When an operation in which the idle leg is rotated forwardly is added in synchronization with the stepping movement of the right and left legs within the lateral plane, robot 21 advances. At this time, the idle leg moves through the air, even though the knee of the idle leg does not bend, due to the use of the left and right tilting or stepping movements within the lateral plane.

Figure 8:
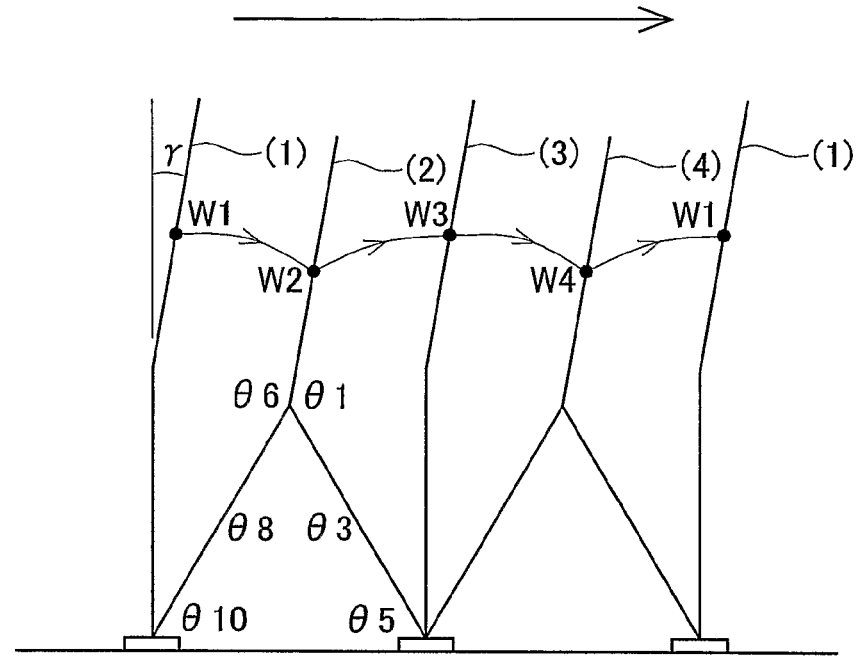
FIG. 8 shows movement paths of the center of gravity within the sagittal plane.

FIG. 8 shows the movement of the center of gravity within the sagittal plane of robot 21 (a plane that includes both the direction in which robot 21 walks and the vertical direction). For ease of explanation, the vertical movement of the center of gravity accompanying the pivoting movement in the lateral direction is not illustrated in FIG. 8. However, the vertical movement of the center of gravity accompanying the pivoting movement in the lateral direction overlaps the actual movement path of the center of gravity.

In state (1), the right leg is the support leg, and the left leg is the idle leg. When robot 21 continues to walk forward, the center of gravity of robot 21 has inertia in the forward direction. Because the ankle joint θ10 of the grounded right leg is free in the forward direction, the center of gravity of robot 21 exhibits the behavior of an inverted pendulum in which the ankle joint θ10 of the right leg is the fulcrum, and moves forward. Because θ8=0 and θ6=−θ10+γ at this point, the torso of robot 21 moves forward while maintaining a posture that is tilted forwardly from the vertical by the angle γ. The hip joints of robot 21 also move forward in tandem with the movement of the center of gravity. Because θ1=−θ10−γ and θ3=0, the left leg (the idle leg) starts moving forward so that the left leg is symmetrical with the right leg with respect to a vertical line. The foot plane of the left leg is parallel to the foot plane of the right leg because θ5=−θ10.

As a result of the stepping movement in the lateral direction, when the left leg is to be placed in the grounded state (2), robot 21 tilts left to switch the support leg from the right leg to the left leg, and the ankle joint θ5 of the newly grounded left leg becomes free in the forward direction. Because the center of gravity of robot 21 has forward inertia, the center of gravity of robot 21 exhibits the behavior of an inverted pendulum in which the ankle joint θ5 is the fulcrum, and moves forward. Because θ3=0 and θ1=θ5−γ at this point, the torso of robot 21 moves forward while maintaining a posture that is tilted forwardly from the vertical by the angle γ. The hip joints of the robot 21 also move forward in tandem with the movement of the center of gravity. Because θ6=θ5+γ and θ8=0, the right leg (the newly lifted idle leg) starts moving forward so that the right leg is symmetrical with the left leg with respect to a vertical line. The foot plane of the right leg is parallel to the foot plane of the left leg because θ10=−θ5.

In state (3), the left leg is the support leg, and the right leg is the idle leg. Because the center of gravity of robot 21 has forward inertia, the center of gravity of robot 21 exhibits the behavior of an inverted pendulum in which the ankle joint θ5 is the fulcrum, and moves forward. The hip joints of robot 21 also move forward in tandem with the movement of the center of gravity. The right leg (the idle leg) steps forward so that the left leg is symmetrical with the right leg with respect to a vertical line.

As a result of the stepping movement in the lateral direction, when the right leg is to be placed in the grounded state (4), robot 21 tilts right to switch the support leg from the left leg to the right leg, and the ankle joint θ10 of the right leg becomes free in the forward direction. Because the center of gravity of robot 21 has forward inertia, the center of gravity of robot 21 exhibits the behavior of an inverted pendulum in which the ankle joint θ10 of the right leg is the fulcrum, and moves forward. The hip joints of robot 21 also move forward in tandem with the center of gravity. After the grounded leg is exchanged, the left leg (the idle leg) steps forward so that the right leg and the left leg are symmetrical with respect to the vertical line, and robot 21 moves to state (1).

The repeated movement from state (1) to state (4) can continue with little energy. If there is no friction in a pivotable or rotatable joint, and no energy loss associated with the grounding of the idle leg, the repeated movement from state (1) to state (4) can be repeated without attenuation. In fact, the aforementioned friction and energy loss do exist. However, by providing small torque by the motors for the rotatable joints that compensates for friction, a state in which friction does not exist can be created.

Figure 9:
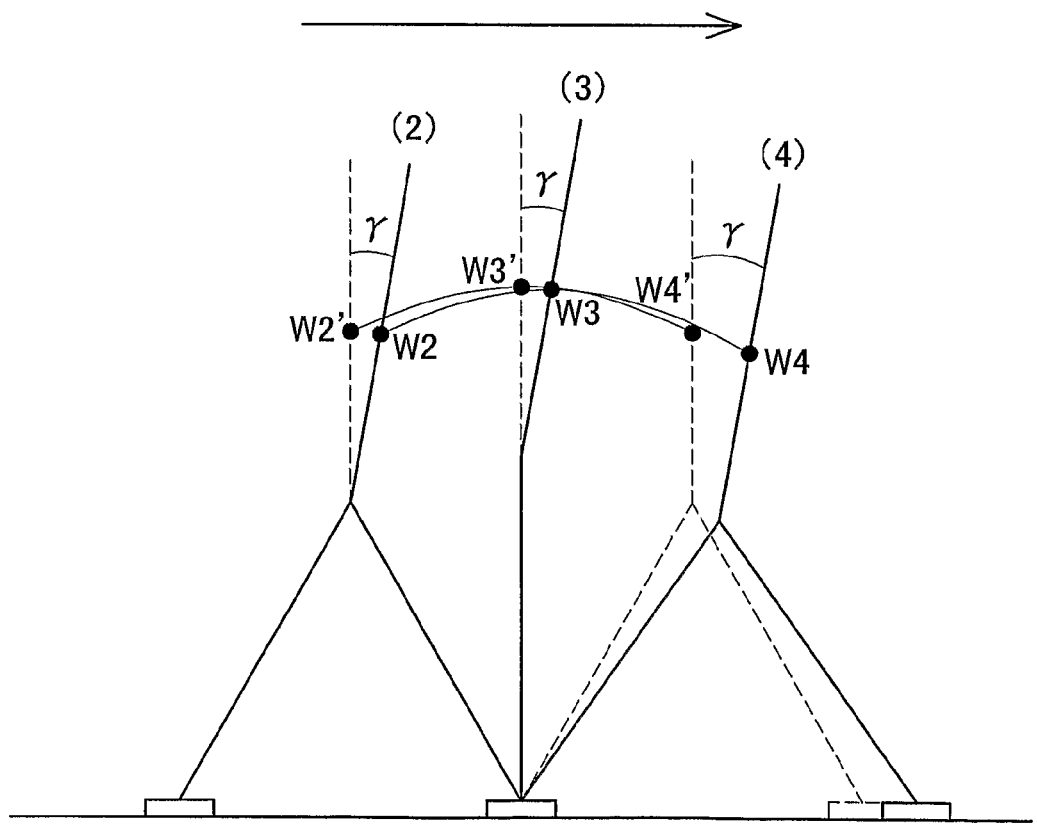
FIG. 9 shows the relationship between the tilt of the torso and the stride.
Figure 10:
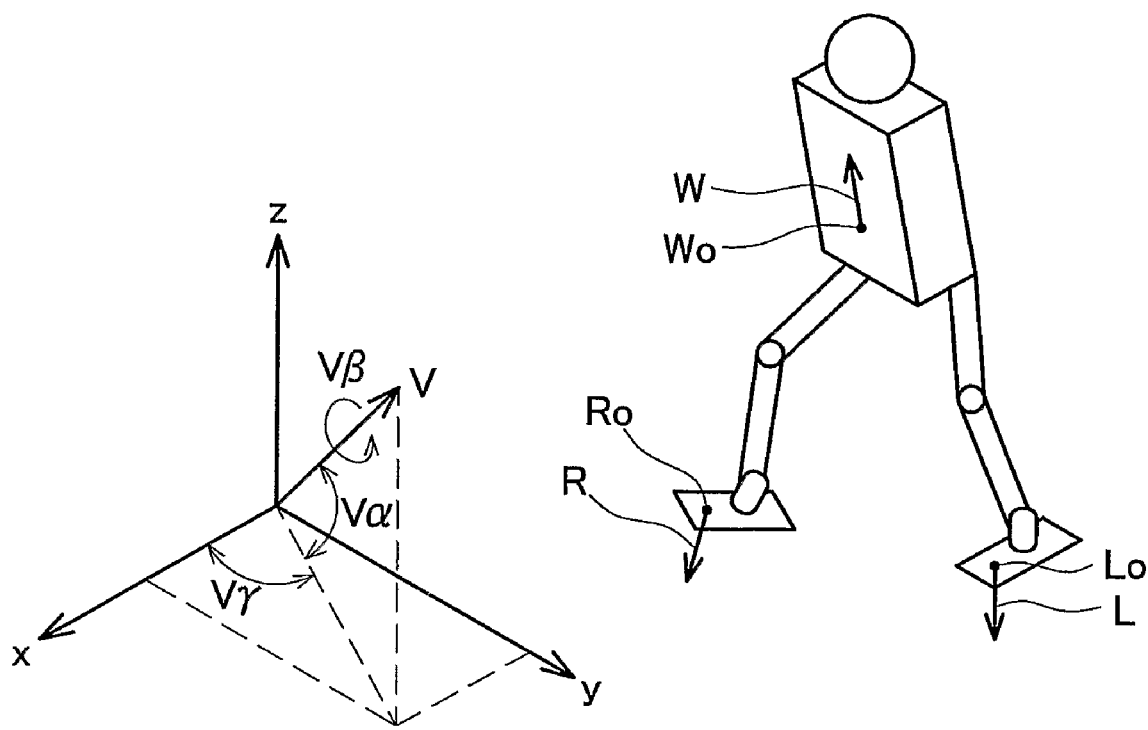
FIG. 10 shows instruction technology for a conventional robot.

The aforementioned movement of robot 21 within the sagittal plane changes depends upon the position of the center of gravity of robot 21. The position of the center of gravity of robot 21 changes, for example, when the torso is tilted forward. FIG. 9 shows the relationship between the movement of robot 21 within the sagittal plane, and the tilt of the torso. FIG. 9 shows the movement from when the left leg is grounded and the right leg is lifted (state (2)), to when the center of gravity of robot 21 moves forward and the right leg is grounded (state (4)). The movement shown with the dashed line is a movement when the torso is not tilted, and the movement shown with the solid line is a movement when the torso is tilted. The center of gravity when the torso is tilted is indicated with W2 to W4, and the center of gravity when the torso is not tilted is indicated with W2' to W4'.

The more the torso is tilted, the more the center of gravity of robot 21 moves forward and downward with respect to the forward walking direction. When the center of gravity moves forward and downward, the distance from the ankle joint of the support leg to the center of gravity shortens during most periods between state (2) and state (4). Because the aforementioned movement in the sagittal plane achieves a natural movement due to the free rotation of the ankle joint of the support leg, the shorter the distance from the ankle joint of the support leg to the center of gravity becomes, the faster the center of gravity moves forward, and the faster the tip of the idle leg moves forward. Thus, when the cycle periods of the stepping movements within the lateral plane are the same, the tip of the idle leg reaches farther the more the torso is inclined, thus widening the stride of robot 21.

By employing the aforementioned relationship between the tilt of the torso and the stride of robot 21, the stride can stabilized. The tilting angle γ of the torso for achieving the aforementioned stride can be identified from the chronological change in the joint angle of the support leg in the forward direction (θ10 or θ5) immediately after the idle leg has contacted the ground, the cycle period of the stepping movement within the lateral plane, and the target stride. Remaining joint angles other than the ankle joint of the support leg are adjusted in order to achieve that tilting angle of the torso.

The identification of the tilting angle γ of the torso with respect to the target stride can be achieved by employing, for example, a correspondence table. A robot walk test is performed, and the relationships between the angles of the free joints, the angle speed, the cycle period of the stepping movement within the lateral plane, the tilting angle of the torso, and the stride obtained under the above conditions are measured in advance, and a correspondence table is produced and stored in the controller 22. The angles of the free joints and the angle speed can be calculated by measuring the chronological changes in the joint angles of those joints. The cycle period of the stepping movements within the lateral plane can be acquired by, for example, measuring the time from the point at which the right leg support A phase was switched to the left leg support B phase, until the point at which the left leg support A phase was switched to the right leg support B phase. The controller 22 will employ the correspondence table to calculate the target tilting angle of the torso from the measured angles of the joints, the angle speed, the cycle period of the stepping movements, and the target stride. The robot 21 will then walk with the target tilting angle of the torso, thus achieving walking with the desired stride.

As noted above, the desired stride can be achieved by adjusting the tilting angle of the torso at the point at which the idle leg comes into contact with the ground, and then controlling the movement of robot 21 in the time period until the new idle leg comes into contact with the ground. By controlling robot 21 in the aforementioned manner, robot 21 can continue to walk with a stable stride even if it receives an external disturbance while walking.

While embodiments of the present invention were described in detail above, these are only examples and do not limit the scope of the patent claims. Various modifications and changes to the specific examples above are included within the technical scope of claims. In addition, the technological elements described in the present specification or drawings exhibit technological utility either alone or in various combinations, and are not to be limited to the combination of the claims disclosed at the time of application. Furthermore, the technology illustrated in the present specification or drawings simultaneously achieves a plurality of objects, and the achievement of even one object from amongst these has technological utility.

The invention claimed is:

1. A robot comprising:
   a torso;
   at least two leg links, each leg link being pivotably connected to the torso by a hip joint and having an ankle joint; and
   a controller executing the following controlling operations:
   1) allowing free rotation of the ankle joint of a grounded leg link in lateral and forward directions;
   2) measuring joint angles of the ankle joint of the grounded leg link in the lateral and forward directions;
   3) calculating target joint angles of remaining joints of the robot other than the ankle joint of the grounded leg link based upon the measured joint angles of the ankle joint of the grounded leg link in the lateral and forward directions; and
   4) adjusting joint angles of the remaining joints to be equal to the calculated target joint angles respectively,
   wherein a period in which one of the leg links is the grounded leg link and the other of the leg links is an idle leg link and a period in which the one of the leg links is the idle leg link and the other of the leg links is the grounded leg link are cyclically repeated for the robot to walk,
   wherein the target joint angles of the remaining joints are calculated based upon the measured joint angles of the ankle joint of the grounded leg link in the lateral and forward directions under the following conditions:
   a) a center of gravity of the robot moves toward a predicted grounding position of the idle leg link between the grounding position of the grounded leg link and the predicted grounding position of the idle leg link in the lateral direction and moves toward the predicted grounding position of the idle leg link in the forward direction when the joint angles of the remaining joints are adjusted to be equal to the calculated target joint angles respectively;
   b) when the idle leg link is newly grounded, the hip joints are positioned ahead of the tip of the previously grounded leg link, and the tip of the newly grounded leg link is positioned ahead of the hip joints; and
   c) a tilting angle of the torso matches a target tilting angle determined based upon the measured joint angle of the ankle joint of the grounded leg link in the forward direction, a cycle period of the idle leg link from lifting to grounding, and a target stride of the idle leg link.

2. A method of controlling a robot comprising at least two leg links, each leg link being pivotably connected to a torso by a hip joint and having an ankle joint; the method comprising:
   1) a step of allowing free rotation of the ankle joint of a grounded leg link in lateral and forward directions;
   2) a step of measuring joint angles of the ankle joint of the grounded leg link in the lateral and forward directions;
   3) a step of calculating target joint angles of remaining joints of the robot other than the ankle joint of the grounded leg link based upon the measured joint angles of the ankle joint of the grounded leg link in the lateral and forward directions; and
   4) a step of adjusting joint angles of the remaining joints to be equal to the calculated target joint angles respectively,
   wherein a period in which one of the leg links is the grounded leg link and the other of the leg links is an idle leg link and a period in which the one of the leg links is the idle leg link and the other of the leg links is the grounded leg link are cyclically repeated for the robot to walk,
   wherein the target joint angles of the remaining joints are calculated based upon the measured joint angles of the ankle joint of the grounded leg link in the lateral and forward directions under the following conditions:
   a) a center of gravity of the robot moves toward a predicted grounding position of the idle leg link between the grounding position of the grounded leg link and the predicted grounding position of the idle leg link in the lateral direction and moves toward the predicted grounding position of the idle leg link in the forward direction when the joint angles of the remaining joints are adjusted to be equal to the calculated target joint angles respectively;
   b) when the idle leg link is newly grounded, the hip joints are positioned ahead of the tip of the previously grounded leg link, and the tip of the newly grounded leg link is positioned ahead of the hip joints; and
   c) a tilting angle of the torso matches a target tilting angle determined based upon the measured joint angle of the ankle joint of the grounded leg link in the forward direction, a cycle period of the idle leg link from lifting to grounding, and a target stride of the idle leg link.

* * * * *